United States Patent [19]

Andrieu et al.

[11] Patent Number: 4,526,872
[45] Date of Patent: Jul. 2, 1985

[54] TRANSPARENT GLASS-CERAMIC OF LIGHT BROWN COLOR AND METHOD OF MAKING

[75] Inventors: Andre Andrieu, Nemours; Jean-Pierre P. Davot; Jean-Pierre A. M. Thibieroz, both of Avon, all of France

[73] Assignee: Corning Glass Works, Corning, N.Y.

[21] Appl. No.: 582,277

[22] Filed: Feb. 22, 1984

[30] Foreign Application Priority Data

May 6, 1983 [FR] France .............................. 83 07595
Jan. 11, 1984 [FR] France .............................. 8400349

[51] Int. Cl.$^3$ .......................... C03C 3/22; C03C 3/04
[52] U.S. Cl. ............................................. 501/4; 501/7
[58] Field of Search ....................................... 501/4, 7

[56] References Cited

U.S. PATENT DOCUMENTS

| | | | |
|---|---|---|---|
| 3,788,865 | 1/1974 | Babcock et al. | 501/7 |
| 4,009,042 | 2/1977 | Rittler | 501/4 |
| 4,018,612 | 4/1977 | Chyung | 501/4 |
| 4,084,974 | 4/1978 | Beall et al. | 501/7 |
| 4,211,820 | 7/1980 | Cantaloupe et al. | 501/4 |
| 4,438,210 | 3/1984 | Rittler | 501/7 |

FOREIGN PATENT DOCUMENTS 6605388 10/1967 Netherlands .............................. 501/7

*Primary Examiner*—Mark L. Bell
*Attorney, Agent, or Firm*—C. S. Janes, Jr.

[57] ABSTRACT

The present invention is primarily concerned with the production of transparent glass-ceramic articles especially suitable for use as cooking utensils nucleated with up to 6% $TiO_2$ and containing up to 0.25% $Fe_2O_3$ and, perhaps, up to 0.1% $MnO_2$, which exhibits a light brown tint that the human eye perceives essentially constant when the dominant wavelength is held between 577-581 nm, purity between 8-15%, and the transmission factor between about 65-80. The desired tint is obtained by including 0.0025-0.02% CoO+$Cr_2O_3$, consisting of 0.001-0.01% CoO and 0.001-0.01% $Cr_2O_3$, in the base composition of the glass-ceramic. An opaque glass-ceramic article exhibiting a light, warm creamy color perceived by the human eye as essentially constant when the dominant wavelength is held between 570-585 nm, the reflectance factor is in excess of 64, and the purity factor is no greater than 8% can be produced from like base compositions which are crystallized in situ at higher temperatures.

4 Claims, 3 Drawing Figures

TRANSPARENT GLASS-CERAMIC OF LIGHT BROWN COLOR AND METHOD OF MAKING

BACKGROUND OF THE INVENTION

Methods for coloring and decolorizing transparent glass-ceramics have been the subject of numerous patents. Several examples of such are set out below:

U.S. Pat. No. 3,788,865 (French Pat. No. 1,474,728) recommends the use of the transition metal oxides CoO, $Cr_2O_3$, $Fe_2O_3$, MnO, and $V_2O_5$ to tint transparent glass-ceramics. It appears that those oxides act either individually or in combination with one another or, also, in combination with other known colorants such as copper sulfide and copper oxide. The tints that could be obtained were designated as ruby, pink, yellow, amber, blue, lavender, and purple.

Netherlands Pat. No. 66 05388 provides another description of the coloring of transparent glass-ceramics, making use of CoO, $Cr_2O_3$, CuO, $Fe_2O_3$, $MnO_2$, NiO, $WO_3$, CdS, CdSe, SeS, and $SeS_2$ as colorants and reports the following colors as being attainable: red, purple, orange, dark blue, green, brown, and gray.

Other patents such as U.S. Pat. Nos. 4,009,042 and 4,018,612 mention the utility of transition metal oxides as colorants for transparent glass-ceramics, but without specifying the colors obtained nor, moreover, the method to achieve those colors.

U.S. Pat. No. 4,211,820 teaches how to confer a red-brown coloration to transparent glass-ceramics which is sufficiently pronounced to reduce to about 20–60% the transmission factor at 800 nm of a sheet about 5 mm thick. The products have a base composition in the general $Li_2O$—$Al_2O_3$—$SiO_2$ field nucleated with $TiO_2$. The desired coloration is developed by the inclusion of $V_2O_5$ in the starting batch.

Corning France S.A., Le Vesinet, France, commercially markets under the trademark VISION cooking utensils of a transparent ceramic exhibiting a light brown tint prepared as described in French Pat. No. 2,405,906; viz., the base compositions—generally in the system $Li_2O$—$Al_2O_3$—$SiO_2$ nucleated with $TiO_2$—form a body displaying an amber color because of the presence of $TiO_2$ as the nucleating agent and the presence of iron oxides as impurities in the batch materials. In order to end up with the desired light brown color, suitably proportioned quantities of $Nd_2O_3$ and $V_2O_5$ are added.

The selected color is characterized by its trichromatic coordinates (x, y, Y) determined in accordance with the procedure standardized by the C.I.E.: a sheet having a thickness of 4 mm with polished surfaces of a reference light brown glass-ceramic, when illuminated with Illuminant C (x=0.310, y=0.316) exhibits the coordinates x=0.331, y=0.337, and the visual transmission factor Y=67%. Other tints with trichromatic coordinates close to those of the reference can be utilized so long as the human eye does not perceive any significant difference, which circumstance holds true so long as the dominant wavelength to which the article is exposed remains between about 577–579 nm and the purity between 8–14% (see control graph in FIG. 1).

One disadvantage in the use of that process for obtaining the light brown color is the high cost of $Nd_2O_3$, which is produced in such limited quantities that slight fluctuations in demand can have a devastating effect upon prices.

OBJECTIVE OF THE INVENTION

The primary objective of the present invention is to produce transparent glass-ceramic articles exhibiting a light brown tint, that is to say, having trichromatic coordinates identical to or at least very close to those of the above-mentioned reference color, but having recourse to agents other than $Nd_2O_3$ and costing much less.

A secondary objective of the present invention is to produce opaque glass-ceramic articles exhibiting a light, warm creamy appearance.

SUMMARY OF THE INVENTION

In practicing the present invention, transparent glass-ceramic articles exhibiting a light brown tint will be prepared from base compositions in the general system $Li_2O$—$Al_2O_3$—$SiO_2$ nucleated with an effective quantity of $TiO_2$ ranging up to 6% by weight, and containing $Fe_2O_3$ as an impurity in an amount up to about 0.25% by weight and perhaps, $MnO_2$ up to about 0.1% by weight. According to the invention $Nd_2O_3$ is replaced by a mixture of CoO and $Cr_2O_3$ with, perhaps, $V_2O_5$. It is therefore possible to adjust the tint by varying the sum and/or ratio of the quantities of CoO and $Cr_2O_3$ in order to compensate for the different amounts of $Fe_2O_3$ present as impurities in the batch materials, of $TiO_2$, of $MnO_2$, if present, and, where the case applies, of $V_2O_5$.

As illustrated in FIG. 1, when the dominant wavelength is held between 577–579 nm, the purity between 8–14%, and the visual transmission factor Y lies between 65–70%, the eye will perceive a light brown tint which is practically constant in the quadrilateral ABCD whose vertices are the coordinates: A represents x=0.3356, y=0.3429; B represents x=0.3374, y=0.3411; C represents x=0.3258, y=0.3305; and D represents x=0.3247, y=0.3316.

The quantities of CoO and $Cr_2O_3$ will generally range between about 10–100 ppm or 0.001–0.01% by weight. The operable weight ratios between those oxides can vary widely, but at least 10 ppm of each is necessary and the sum should be at least 25 ppm. The $V_2O_5$, when the case applies, will be limited to a maximum of about 50 ppm (0.005%).

It was noted that the new coloring mixture with cobalt and chrome can result, because of the greater Y transmission, i.e., up to about 80, in a visible impression tending toward the yellow. This can be compensated for by shifting the control polygon toward the red according to the graph in FIG. 2; that is to say, shifting from the preceding quadrilateral ABCD, which corresponded to a dominant wavelength of 577–579 nm and a purity of 8–14%, to quadrilateral A'B'C'D' which corresponds to a dominant wavelength of 579–581 nm and a purity of 11–15%.

Therefore, the transparent glass-ceramic articles of the present invention will exhibit a light brown tint perceived by the human eye as being essentially constant when the dominant wavelength lies between 577–581 nm, the purity between 8–15%, and the transmission factor between about 65–80.

The preferred base compositions for transparent glass-ceramic articles of the present invention consist essentially, in terms of weight percent on the oxide basis, of about

| $SiO_2$ | 62–70 | BaO | 0–2 |

| | | | |
|---|---|---|---|
| Al₂O₃ | 17.75–21.5 | ZrO₂ | 1–2.5 |
| MgO | 1–2.5 | TiO₂ | 1.8–6 |
| ZnO | 0.5–6 | Fe₂O₃ | 0–0.25 |
| Li₂O | 2.5–3.5 | As₂O₃ | 0–1 | wherein the sum of the alkali metal oxides other than Li₂O and the alkaline earth metal oxides other than BaO does not exceed about 0.5%.

When precursor glass bodies having the above compositions are subjected to heat treatment to effect crystallization in situ, thereby transforming the glass into a transparent glass-ceramic, β-quartz solid solution constitutes the predominant crystal phase.

In the most general sense the method of the present invention consists essentially of three principal operations:

(1) melting a glass forming batch of predetermined composition containing a quantity of TiO₂ effective as a nucleating agent up to 6% by weight, up to 0.25% by weight Fe₂O₃, and from 0.0025–0.02% by weight of a mixture of CoO and Cr₂O₃, with 0.001–0.01% by weight CoO and 0.001–0.01% by weight Cr₂O₃;

(2) cooling the melt to a temperature below its transformation range and preparing a glass article of a desired configuration; and (3) subjecting the glass article to a predetermined heat treatment to produce a controlled crystallization therein, thereby transforming the glass article into a glass-ceramic article.

The crystallization process may take place in two stages: first, the glass article is subjected to a temperature close to the transformation range in order to develop nuclei therein; and, second, the nucleated article is then subjected to a higher temperature to bring about the development of crystals on the nuclei. Such a two-step process normally leads to glass-ceramics of higher crystallinity with crystals of more uniform dimensions.

With the above-described preferred compositions, nucleation temperatures between about 750°–850° C. and crystallization temperatures between about 850°–950° C. give transparent, highly-crystalline glass-ceramics, that is to say, more than 50% by volume.

The base compositions in the Li₂O—Al₂O₃—SiO₂ system nucleated with TiO₂ can also be crystallized to opaque glass-ceramic articles containing β-spodumene solid solution as the predominant crystal phase by heat treating the precursor glass at temperatures in excess of 950° C., normally about 1000°–1200° C. with the preferred range being about 1100°–1150° C. Where such articles are to be utilized as culinary ware or tableware, the color of the product must be deemed pleasing to the user.

When the transparent glass-ceramic bodies tinted light brown through the inclusion of Nd₂O₃ and V₂O₅ in accordance with French Pat. No. 2,405,906, supra, are crystallized to an opaque state, the bodies take on a blue-gray tint. Extensive consumer testing has indicated that the material ought not to exhibit a bluish or grayish cast; rather, a light, warm creamy hue is much favored.

We have found that, when the transparent glass-ceramic tinted light brown through the combination of CoO and Cr₂O₃, as described above, is crystallized to the opaque state, the resulting product displays a very desirable, light, warm creamy color. Accordingly, the use of CoO and Cr₂O₃ enables the production of both transparent and opaque glass-ceramic articles especially suitable for culinary ware and tableware from the same base compositions. This capability is of obvious practical advantage commercially.

DESCRIPTION OF PREFERRED EMBODIMENTS

Figure 1:
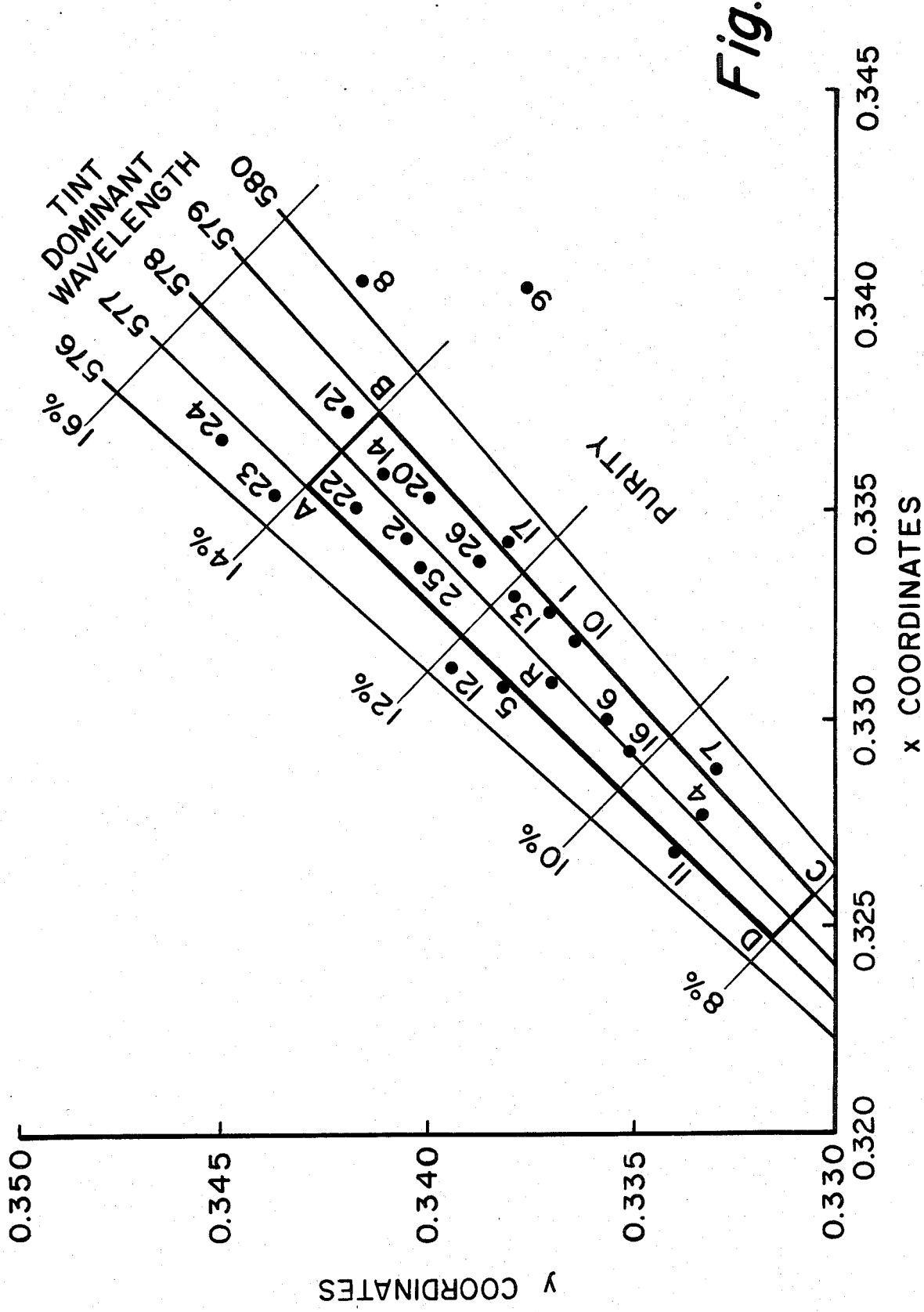
FIG. 1 comprises a control graph of chromaticity coordinates x and y utilizing a dominant wavelength between 577–579 nm and a purity between 8–14%.

The present invention is illustrated through the base composition below expressed as parts by weight on the oxide basis. It may be assumed in practice that, because the sum of the individual components closely approaches 100, the values are expressed in weight percent. The batch ingredients may comprise any materials, either oxides or other compounds, which, when melted together, are transformed into the desired oxides in adequate proportions.

| | | | |
|---|---|---|---|
| SiO₂ | 68.7 | TiO₂ | 2.4 |
| Al₂O₃ | 19.5 | ZrO₂ | 2.0 |
| Li₂O | 2.8 | BaO | 0.7 |
| MgO | 1.7 | As₂O₃ | 0.7 |
| ZnO | 1.0 | | |

Table I illustrates additions of CoO, Cr₂O₃, Fe₂O₃, MnO₂, and V₂O₅ to this base composition in order to demonstrate adjustments that can be made to the tint of the glass-ceramic. In each case the batches were compounded with intimate mixing to assist in obtaining a homogeneous final product and then charged into silica crucibles. The latter were introduced into a furnace operating at 1600° C. and the melting continued for 24 hours. The melts were poured onto a steel plate and the resulting glass slabs immediately annealed at 650° C. These slabs were then transformed into transparent, highly crystalline glass-ceramic bodies through a two-stage heat treatment: (1) exposing at 770° C. for one hour to cause the development of nuclei; and (2) exposing at 890° C. for one hour to develop crystals on those nuclei. After cooling to ambient temperature, flat plates of 4 mm thickness with polished upper and lower surfaces were prepared from the slabs for colorimetric measurements and determination of trichromatic coordinates.

Table I reveals the variation in colors possible with different concentrations of CoO, Cr₂O₃, Fe₂O₃, MnO₂, and V₂O₅. The chromaticity coordinates x and y were reported on FIG. 1 to show the control polygon with respect to the reference glass-ceramic at the central point R of coordinates x=0.331 and y=0.337, so that the eye detects no difference in color.

TABLE I

| Ex. | % CoO | % Cr$_2$O$_3$ | % Fe$_2$O$_3$ | % V$_2$O$_5$ | % MnO$_2$ | Trichromatic Coordinates x | y | Y |
|---|---|---|---|---|---|---|---|---|
| 1 | 0.004 | 0.004 | 0.08 | 0.002 | — | 0.3327 | 0.3369 | 0.735 |
| 2 | 0.004 | 0.005 | 0.08 | 0.002 | — | 0.3345 | 0.3405 | 0.733 |
| 3 | 0.005 | 0.003 | 0.06 | — | — | 0.3238 | 0.3257 | 0.755 |
| 4 | 0.005 | 0.005 | 0.06 | — | — | 0.3277 | 0.3334 | 0.756 |
| 5 | 0.005 | 0.007 | 0.06 | — | — | 0.3309 | 0.3382 | 0.739 |
| 6 | 0.005 | 0.0055 | 0.06 | — | — | 0.3300 | 0.3357 | 0.745 |
| 7 | 0.006 | 0.0055 | 0.06 | — | — | 0.3288 | 0.3330 | 0.737 |
| 8 | 0.003 | 0.0005 | 0.11 | 0.0055 | — | 0.3406 | 0.3416 | 0.704 |
| 9 | 0.005 | 0.0005 | 0.11 | 0.0055 | — | 0.3404 | 0.3375 | 0.671 |
| 10 | 0.006 | 0.0055 | 0.11 | — | — | 0.3320 | 0.3363 | 0.723 |
| 11 | 0.003 | 0.0035 | 0.08 | — | — | 0.3269 | 0.3339 | 0.785 |
| 12 | 0.003 | 0.0035 | 0.11 | — | — | 0.3313 | 0.3394 | 0.774 |
| 13 | 0.004 | 0.0045 | 0.08 | — | — | 0.3330 | 0.3379 | 0.720 |
| 14 | 0.004 | 0.0045 | 0.08 | 0.003 | — | 0.3360 | 0.3411 | 0.729 |
| 15 | 0.004 | 0.0045 | 0.08 | 0.006 | — | 0.3440 | 0.3471 | 0.682 |
| 16 | 0.0045 | 0.0045 | 0.08 | — | — | 0.3293 | 0.3351 | 0.757 |
| 17 | 0.0045 | 0.0045 | 0.08 | 0.002 | — | 0.3343 | 0.3381 | 0.726 |
| 18 | 0.005 | 0.005 | 0.142 | — | 0.015 | 0.3446 | 0.3508 | 0.676 |
| 19 | 0.005 | 0.005 | 0.202 | — | 0.015 | 0.3494 | 0.3552 | 0.630 |
| 20 | 0.005 | 0.002 | 0.142 | — | 0.015 | 0.3351 | 0.3393 | 0.728 |
| 21 | 0.004 | 0.002 | 0.212 | — | 0.015 | 0.3375 | 0.3412 | 0.721 |
| 22 | 0.004 | 0.004 | 0.062 | — | 0.015 | 0.3346 | 0.3415 | 0.741 |
| 23 | 0.004 | 0.004 | 0.062 | — | 0.035 | 0.3356 | 0.3431 | 0.721 |
| 24 | 0.004 | 0.004 | 0.062 | — | 0.095 | 0.3373 | 0.3445 | 0.713 |
| 25 | 0.004 | 0.0035 | 0.062 | — | 0.095 | 0.3344 | 0.3405 | 0.735 |
| 26 | 0.004 | 0.0030 | 0.062 | — | 0.095 | 0.3332 | 0.3385 | 0.731 |

The examination of FIG. 1 clearly brings out the importance of maintaining the amounts of colorants CoO and Cr$_2$O$_3$ within the precise narrow limits and the necessity of maintaining the amounts of Fe$_2$O$_3$, MnO$_2$, and, should the occasion arise, V$_2$O$_5$ at low levels. Hence, for example, the chromatic coordinates of Examples 3, 15, 18, and 19 are removed to such an extent from those desired that they lie outside of the drawing, while Examples 7, 8, 9, 12 and 17 are outside of the quadrilateral ABCD.

It goes without saying that with minor modifications the same rules for adjusting color apply to other glass-ceramic compositions, so long as they contain TiO$_2$ as nucleating agent and Fe$_2$O$_3$ and, perhaps, MnO$_2$ in amounts ranging up to 0.25% and 0.1% by weight, respectively.

Figure 2:
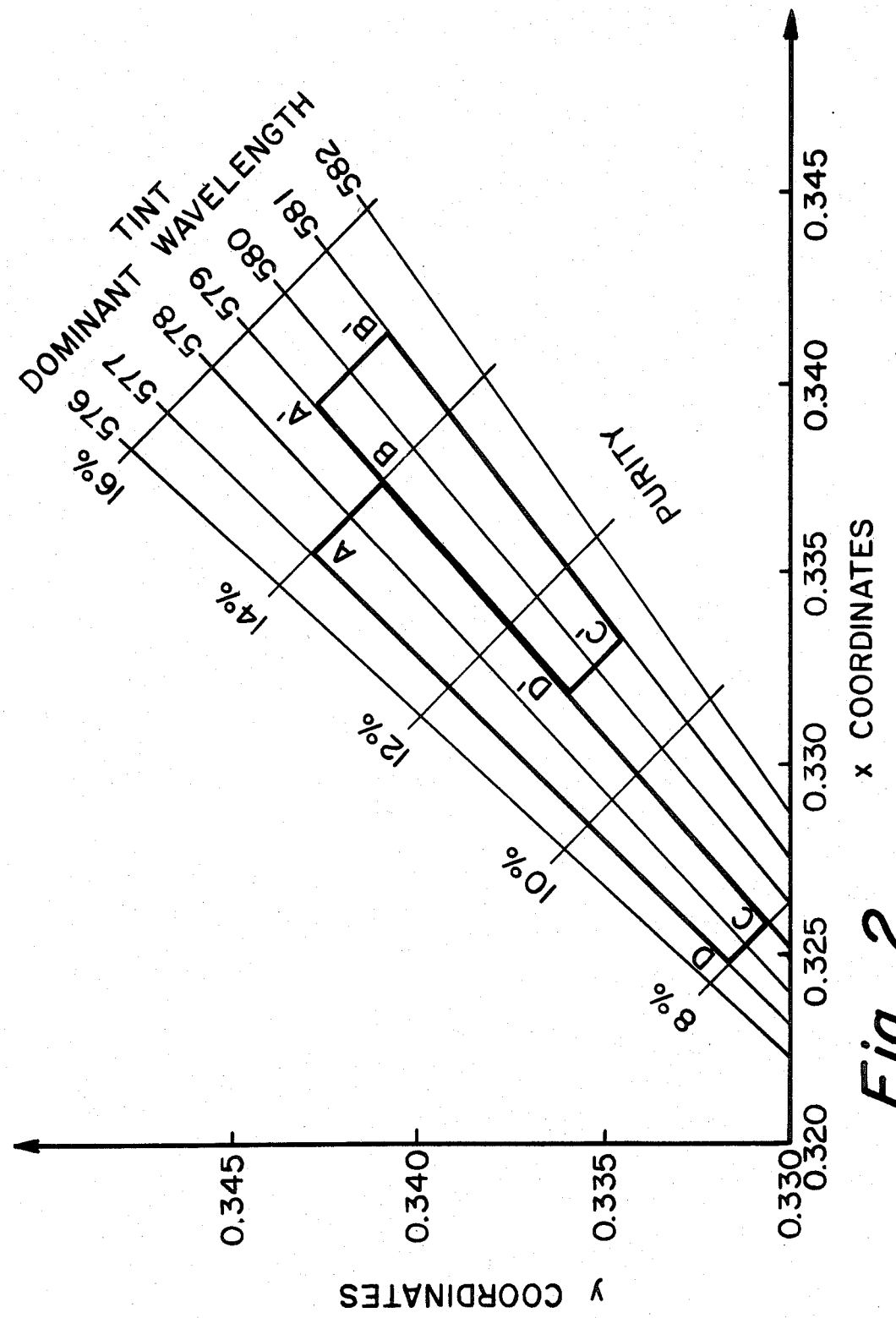
FIG. 2 comprises a control graph of chromaticity coordinates x and y utilizing a dominant wavelength between 579–581 nm and a purity between 11–15%.

Furthermore, as has been indicated above, it may be desired to shift from the quadrilateral ABCD of FIG. 1 to the quadrilateral A'B'C'D' of FIG. 2 (in which the first one has also been included), the vertices of the latter quadrilateral having the following coordinates:

| A' | x = 0.3395 | y = 0.3430 |
|---|---|---|
| B' | x = 0.3415 | y = 0.3410 |
| C' | x = 0.3330 | y = 0.3345 |
| D' | x = 0.3318 | y = 0.3360 |

The shift of the color from ABCD to A'B'C'D' is accomplished by increasing the ratio CoO:Cr$_2$O$_3$.

To illustrate the capability of the present invention to provide opaque glass-ceramic bodies exhibiting a pleasing white appearance, glass slabs were prepared from the same base composition and via the same process steps as reported above with respect to the transparent glass-ceramics. Table II records various additions, in weight percent, of CoO, Cr$_2$O$_3$, Fe$_2$O$_3$, and V$_2$O$_5$ to the base glass composition to demonstrate adjustments that can be made to the color of the body. Example 30 is deemed to reflect an ideal ting and Examples 31 and 32 illustrate the blue-gray hue manifested when Nd$_2$O$_3$ and V$_2$O$_5$ are present to impart a light brown tint to a transparent glass-ceramic.

In each instance the glass slabs were converted into an opaque glass-ceramic by means of a two-stage heat treatment; the first step comprising exposure for one hour at 770° C. for nucleation. Table II recites the time (in minutes) and temperature (in °C.) for the crystallization step. X-ray diffraction analyses identified β-spodumene solid solution as the predominant crystal phase. Colorimetric measurements and determination of trichromatic coordinates were conducted on flat plates of 4 mm thickness with polished surfaces.

TABLE II

| Ex. | Nd$_2$O$_3$ | V$_2$O$_5$ | CoO | Cr$_2$O$_3$ | Fe$_2$O$_3$ | Temp | Time | Trichromatic Coordinates x | y | Y |
|---|---|---|---|---|---|---|---|---|---|---|
| 30 | | | | | | | | 0.3155 | 0.3220 | 0.780 |
| 31 | 0.46 | 0.005 | — | — | 0.0675 | 1115 | 40 | 0.3081 | 0.3136 | 0.661 |
| 32 | 0.46 | 0.005 | — | — | 0.0675 | 1140 | 24 | 0.3096 | 0.3155 | 0.690 |
| 33 | — | 0.002 | 0.004 | 0.004 | 0.120 | 1140 | 24 | 0.3222 | 0.3285 | 0.656 |
| 34 | — | 0.002 | 0.004 | 0.0045 | 0.075 | 1130 | 45 | 0.3193 | 0.3257 | 0.700 |
| 35 | — | 0.002 | 0.0045 | 0.0045 | 0.110 | 1130 | 30 | 0.3176 | 0.3225 | 0.671 |
| 36 | — | 0.002 | 0.004 | 0.004 | 0.075 | 1130 | 30 | 0.3145 | 0.3191 | 0.702 |
| 37 | — | 0.0012 | 0.005 | 0.0055 | 0.082 | 1130 | 30 | 0.3132 | 0.3183 | 0.737 |

Figure 3:
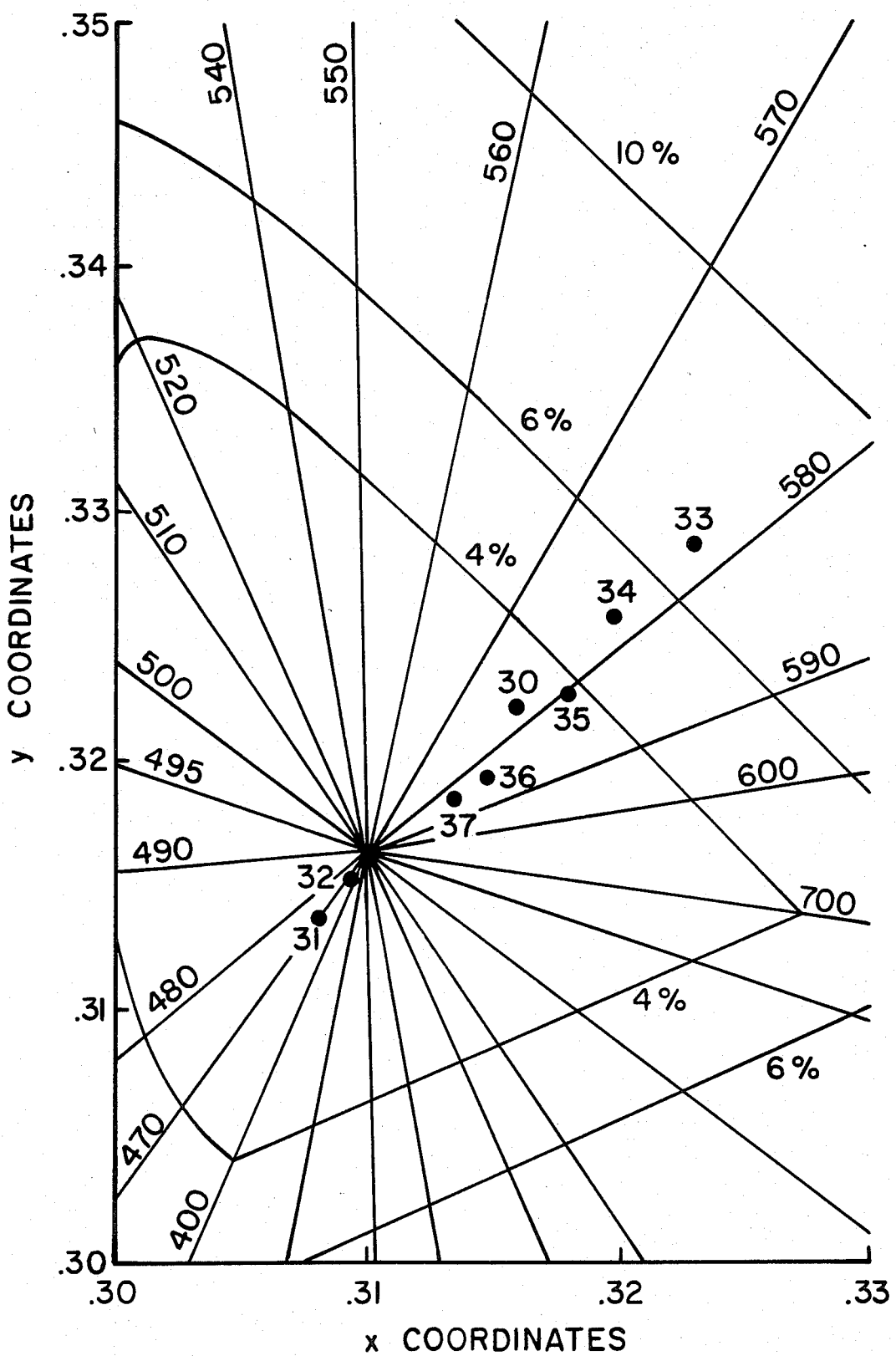
FIG. 3 is a C.I.E. chromaticity diagram utilizing Illuminant C, wherein the color coordinates are used in accordance with the C.I.E. system for opaque materials, which means that the coordinates are measured by diffuse reflection instead of by the transmission of light.

An examination of FIG. 3, wherein the color coordinates comply with the C.I.E. system in like manner for transparent bodies, the sole difference being that Y designates the diffuse reflection factor instead of the transmission factor, in conjunction with Table II clearly illustrated the salutary effect upon color which the combination of CoO and $Cr_2O_3$ brings to the opaque glass-ceramic. Thus, Examples 33–37 demonstrate the capability of obtaining the coloration of Example 30 with various levels of impurities ($MnO_2$ in minuscule amounts may also be present) and different crystallization heat treatments. Because the reflection factor is lower in those Examples than for Example 30, the are perceived as "less white"; but the difference is so small as to be essentially indistinguishable to the eye because the dominant wavelength and purity are nearly the same. Hence, the x coordinates will range between about 0.3110–0.3240, the y coordinates between about 0.3160–0.3290, the reflectance factor will be in excess of 64, and the purity no greater than 8%.

We claim:

1. A transparent glass-ceramic article wherein $\beta$-quartz solid solution constitutes the predominant crystal phase exhibiting a light brown tint perceived by the human eye as essentially constant when the dominant wave length lies between 577–581 nm, the purity between 8–15%, and the transmission faction between 65–80, consisting essentially, expressed in terms of weight percent on the oxide basis, of about

| $SiO_2$ | 62–70 | $TiO_2$ | 1.8–6 |
|---|---|---|---|
| $Al_2O_3$ | 17.75–21.5 | $Fe_2O_3$ | 0–0.25 |
| MgO | 1–2.5 | $As_2O_3$ | 0–1 |
| ZnO | 0.5–6 | CoO | 0.001–0.01 |
| $Li_2O$ | 2.5–3.5 | $Cr_2O_3$ | 0.001–0.01 |
| BaO | 0–2 | CoO + $Cr_2O_3$ | 0.0025–0.02 |
| $ZrO_2$ | 1–2.5 | | | wherein the sum of alkali metal oxides other than $Li_2O$ and alkaline earth metal oxides rather than BaO does not exceed about 0.5%.

2. A transparent glass-ceramic article according to claim 1 wherein said base composition also contains up to 0.005% $V_2O_5$ and/or up to 0.1% $MnO_2$.

3. A opaque glass-ceramic article wherein $\beta$-spodumene solid solution constitutes the predominant crystal phase, exhibiting a light, warm creamy color perceived by the human eye as essentially constant when the dominant wave length lies between 570–585 nm, the reflectance factor is in excess of 64, and the purity no greater than 8%, consisting essentially, expressed in terms of weight percent on the oxide basis, of about

| $SiO_2$ | 62–70 | $TiO_2$ | 1.8–6 |
|---|---|---|---|
| $Al_2O_3$ | 17.75–21.5 | $Fe_2O_3$ | 0–0.25 |
| MgO | 1–2.5 | $As_2O_3$ | 0–1 |
| ZnO | 0.5–6 | CoO | 0.001–0.01 |
| $Li_2O$ | 2.5–3.5 | $Cr_2O_3$ | 0.001–0.01 |
| BaO | 0–2 | CoO + $Cr_2O_3$ | 0.0025–0.02 |
| $ZrO_2$ | 1–2.5 | | | wherein the sum of alkali metal oxides other than $Li_2O$ and alkaline earth metal oxides other than BaO does not exceed about 0.5%.

4. An opaque glass-ceramic article according to claim 3 wherein said base compositions also contains up to 0.002% $V_2O_5$ and/or up to 0.1% $MnO_2$.

* * * * *